Sept. 27, 1955 W. A. FINLEY 2,718,801
TUBULAR DEVICE FOR THE DECAPPING OF CONTAINERS
Filed May 21, 1953

INVENTOR.
WILLIAM A. FINLEY
BY
ATTORNEY

United States Patent Office 2,718,801
Patented Sept. 27, 1955

2,718,801

TUBULAR DEVICE FOR THE DECAPPING OF CONTAINERS

William A. Finley, Oaklyn, N. J., assignor to Supplee-Wills-Jones Milk Company, Philadelphia, Pa., a corporation of Pennsylvania Application May 21, 1953, Serial No. 356,471

8 Claims. (Cl. 81—3.41)

This invention relates to a decapping tool for containers and particularly to a tool for removing caps from milk bottles and the like.

In the dairy industry, unsold bottles of milk are returned to the dairies in relatively large numbers where they must be decapped for emptying. The process is time consuming and is reflected in the overhead of all dairy operations.

One object of the present invention, therefore, is to provide an improved tool for facilitating the removal of caps from containers.

Another object of the invention is to provide a tool for removing caps from containers whereby it is unnecessary to extract the removed cap from the tool after each removal operation.

In accordance with the invention, a decapping tool may be provided including a cap receiving magazine and a working end for engaging the bottle caps including a self-acting chuck which, within the tool, is in communication with the magazine. The chuck is so arranged with resiliently biased locking dogs that it will, when forced over the capped end of the bottle, engage beneath the flange of the cap in such fashion that the cap may be readily wrenched from the bottle without damage to the bottle.

The invention, as well as other objects and features thereof, will be better understood by reference to the accompanying drawing in which.

Figure 1:
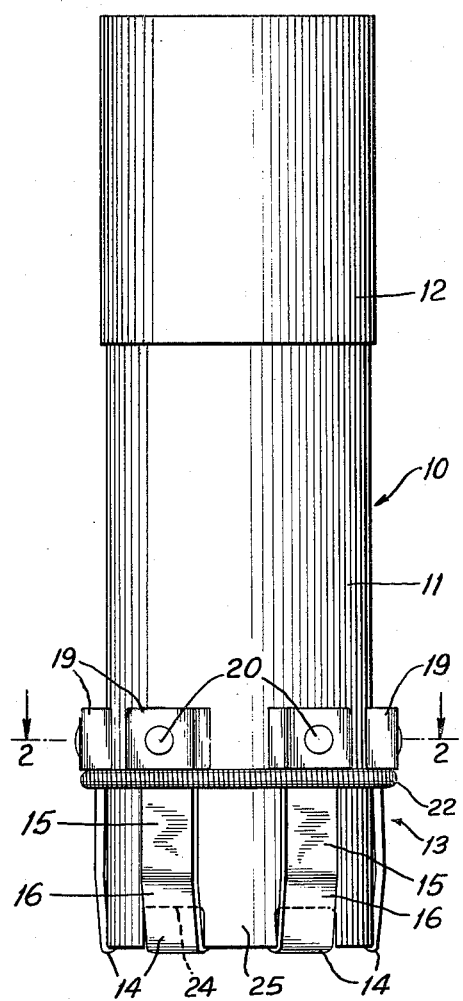
Figure 1 is a side view of a complete decapping tool.
Figure 3:
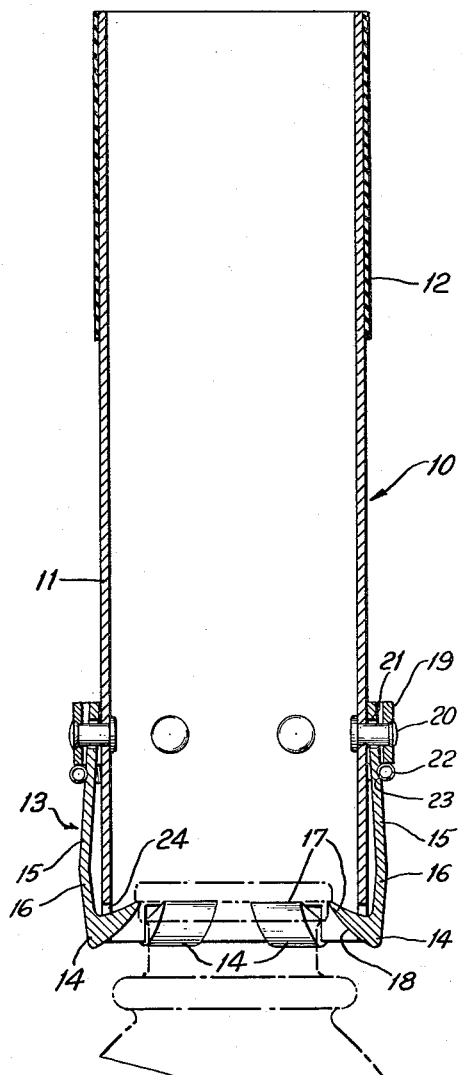
Figure 3 is a view in vertical section taken on the line 3—3 of Figure 2 looking in the direction of the arrows, but showing the tool in a working position.
Figure 2:
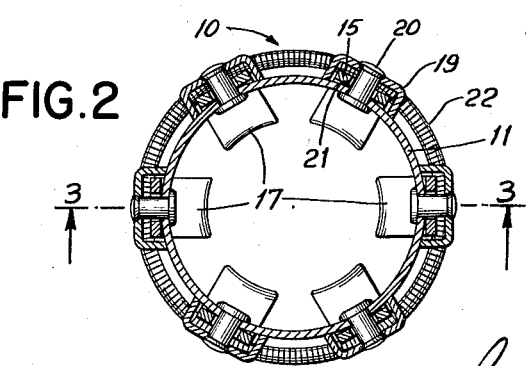
Figure 2 is a view in horizontal section taken on the line 2—2 of Figure 1 looking in the direction of the arrows.

The invention is illustrated as embodied in a bottle decapping tool 10 which is particularly adapted for removing the caps from milk bottles of the type illustrated in part in phantom lines in Figure 3 for example. The decapping tool includes a frame which may be in the form of an elongated tubular member 11 having an inside diameter which is slightly larger than the diameter of the mouth of the bottles and bottle caps upon which it operates. The outside diameter of the tubular member 11 is preferably of a size affording a comfortable hand hold and may include, if desired, a rubber hand-grip sleeve 12 at its upper or trailing end.

The lower or working end of the tool includes a self-acting chuck assembly 13 which may be in the form of a plurality of, say six, dogs 14 circumferentially arrayed about the outer surface of the tubular member 11 and pivotally attached thereto at points spaced back from the working end. Each of the dogs 14 may comprise a shank 15 having a slightly inturned lower portion 16 carrying near its free end an upwardly facing hook 17 and, on the reverse or non-working side of the hook 17, a downwardly facing camming surface 18 of reverse inclination with respect to the axis of the tool.

The dogs 14 are pivotally attached near the upper ends of their shanks to the outer surface of the tubular member 11 by means of connector assemblies each of which may include a radially outstanding cleat 19 locked to the tubular member by a through-pin or rivet 20, the latter also passing through an aperture 21 formed in the shank 15. The aperture 21 is over sized to afford certain freedom of movement of the dog 14 and the cleat 19 is spaced sufficiently far from the surface of the tubular member to afford limited swinging movement of the dog in the plane containing the axes of the tool and of the dog.

Each of the dogs is urged radially inwardly by resilient means in the form of a girth spring 22, for example, which finds a resting place against the under edges of the cleats 19 and also in slight indentations 23 formed in the outer surfaces of the shanks 15. To receive the inturned hooks 17 of the dogs 14, the working end of the tubular member 11 is formed around its periphery with notches 24, the lowermost portions of the dogs and the lowermost portion of the tubular member thereby being disposed more or less in a common plane at the mouth of the chuck assembly 13. The notches 24 in effect form depending fingers 25 on the sleeve 11 at the working end of the tool.

In operation, the tool is grasped in the hand and forced down over the mouth of a capped bottle or container, the dogs 14 of the chuck assembly being forced radially outwardly by the camming action of the reversely inclined surfaces 18 engaging the outer surfaces of the container cap. As the tool slides down over the mouth of the container beneath the cap, the dogs of the chuck will be caused by the resilient means 22 to snap inwardly so that the hooks 17 engage beneath the flange of the cap. The cap may then easily be wrenched free of the container by a simple wrenching action in which the tool is moved so that its axis is swung out of coincidence with the axis of the container. With the cap thus wrenched free, the tool may then be lifted from the mouth of the container carrying with it the removed cap which will then be disposed within the body of the tubular member 11, the latter serving as a magazine. A large number of caps may thus be removed without stopping to empty the tool. When it is desired to empty the magazine of waste caps, the tool need only be inverted by a quick flick of the wrist, causing the caps to empty through the open, trailing end of the tubular member 11.

In operation, it should be noted that the reversely inclined surfaces 18 at the outer ends of the dogs 14 enable the tool to be cocked out of alignment with the axis of the container at the time the cap is wrenched free. Assuming, for example, that the tool is being rocked toward the operator, those dogs which are on the near side of the tool will be inactive whereas those on the far side will engage the under side of the cap to draw it upwardly. Because the under surfaces of the inactive dogs are reversely inclined, i. e. taper upwardly toward the axis of the tool, they will not interfere with this rocking motion and it is not possible for them to damage the container. In this connection, the depending fingers 25 of the tubular member 11 on the near side of the tool may ultimately engage the container to afford an abutment against which the tool may react. To prevent damage to the mouth of the container, the lower inside edges of the depending fingers 25 should be tapered or rounded.

While the invention has been described with specific reference to the accompanying drawing, it should not be regarded as limited in scope except as defined in the following claims.

I claim:

1. A tool for decapping containers comprising a tubular member having an inside diameter exceeding the diameter of the caps to be removed, expandable chuck means at one end of the tubular member, cam means for engaging a cap to expand the chuck to pass about caps secured on containers and having hook means for engaging the caps beneath their margins, resilient means for contracting the the chuck means, thereby to prevent movement of the caps from the tool via their path of entry, whereby as caps are removed from successive containers they will be forced back into the tubular member, the other end of the tubular member being formed with a discharge opening to effect the release of accumulated caps.

2. A tool for decapping containers comprising a tubular member having an inside diameter exceeding the diameter of the caps to be removed, a plurality of notches formed in the tubular member at one end thereof, a chuck assembly mounted on the member adjacent said one end and including a plurality of dogs, means to mount the dogs on the outside of the member for pivotal movement radially with respect to the axis of the container, hook portions formed on the dogs and respectively entering said notches, whereby the hook portions are adapted to be moved radially outwardly to receive a cap on a container, and resilient means to urge the dogs radially inwardly to cause the hook portions to underlie the cap.

3. A tool in accordance with claim 2, the portions of the tubular member between the notches comprising fingers, the ends of the fingers and the ends of the dogs being substantially coplanar.

4. A tool in accordance with claim 3, the dogs being formed with reversely inclined camming surfaces whereby the caps which are entered axially into the chuck assembly cause the dogs to move radially outwardly to pass about the cap, and resilient means urging the dogs radially inwardly to cause the hook portions to engage beneath the caps.

5. A tool for decapping containers comprising a frame having a cap receiving magazine formed therein, a working end on the frame in communication with the magazine and having a minimum diameter greater than that of the caps to be removed, and a chuck assembly carried by the frame at the working end thereof and including a plurality of circumferentially arrayed dogs pivotally mounted on the frame for radial movement with respect to the axis of said working end, said dogs having inwardly disposed hook portions normally occupying at least a portion of the open end, and yieldable means for urging the dogs radially inwardly toward the axis of the opening.

6. A tool in accordance with claim 5 including reversely inclined camming surfaces formed on the non-working sides of hook portions whereby forcing of the chuck against a cap to be removed causes the dogs to move radially outwardly.

7. A tool for decapping containers comprising a tubular member having open ends, the inside diameter of the member being greater than the diameter of the caps to be removed and the exterior of the member affording a handle to be gripped, a plurality of dogs circumferentially arrayed about one end of the member, each dog having a shank disposed substantially parallel to the axis of the member and a hook near one end of the shank facing radially inwardly with respect to the axis of the member to infringe upon the opening of said one end, means to pivotally mount each dog on said member by its shank at a point spaced from the hook, resilient means to urge the dogs radially inwardly, and a reversely inclined camming surface on the non-working side of each hook whereby when the tool is forced over a cap to be removed said surfaces will cause the dogs to swing radially outwardly in order to pass about the cap, after which said resilient means will cause the hooks of the dogs to become disposed beneath the margins of the cap.

8. A tool in accordance with claim 7 including openings formed in the sides of the tubular member at said one end and entered by the said hooks.

References Cited in the file of this patent
UNITED STATES PATENTS

| | | |
|---|---|---|
| 2,564,536 | Lepkowski | Aug. 14, 1951 |
| 2,566,598 | Castner | Sept. 4, 1951 |